(12) United States Patent
Azgin et al.

(10) Patent No.: US 9,960,999 B2
(45) Date of Patent: May 1, 2018

(54) BALANCED LOAD EXECUTION WITH LOCALLY DISTRIBUTED FORWARDING INFORMATION BASE IN INFORMATION CENTRIC NETWORKS

(71) Applicant: Futurewei Technologies, Inc., Plano, TX (US)

(72) Inventors: Aytac Azgin, Santa Clara, CA (US); Ravishankar Ravindran, San Ramon, CA (US); Asit Chakraborti, Pleasanton, CA (US); Guo-Qiang Wang, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 274 days.

(21) Appl. No.: 14/822,606

(22) Filed: Aug. 10, 2015

(65) Prior Publication Data

US 2017/0046342 A1    Feb. 16, 2017

(51) Int. Cl.
*G06F 17/30* (2006.01)
*H04L 12/743* (2013.01)
*H04L 12/745* (2013.01)

(52) U.S. Cl.
CPC ........ *H04L 45/7453* (2013.01); *H04L 45/748* (2013.01)

(58) Field of Classification Search
CPC combination set(s) only.
See application file for complete search history.

(56) References Cited

U.S. PATENT DOCUMENTS

| | | | |
|---|---|---|---|
| 2003/0067930 A1* | 4/2003 | Salapura ................. | H04L 47/10 370/412 |
| 2004/0047362 A1* | 3/2004 | Menth ..................... | H04L 12/56 370/412 |
| 2005/0259672 A1* | 11/2005 | Eduri ..................... | G06F 13/385 370/412 |
| 2007/0156687 A1* | 7/2007 | Idicula ................. | G06F 17/3023 |
| 2008/0177835 A1* | 7/2008 | Chaar ................... | G06F 3/0482 709/204 |
| 2008/0267193 A1* | 10/2008 | Fought ................. | H04L 45/745 370/395.32 |
| 2010/0195655 A1* | 8/2010 | Jacobson .............. | H04L 45/748 370/392 |
| 2011/0122889 A1 | 5/2011 | Pacella et al. | |
| 2011/0149963 A1 | 6/2011 | Hamilton et al. | |

(Continued)

*Primary Examiner* — Etienne Leroux
(74) *Attorney, Agent, or Firm* — Conley Rose, P.C.

(57) ABSTRACT

A method implemented in a content node configured to operate in an information centric network (ICN) comprising allocating each of a plurality of memory spaces coupled to a processor exclusively to a particular thread from a plurality of threads allocated in the processor, wherein the processor is in a content node; assigning each of a plurality of namespaces at a defined level exclusively to one of the particular threads from the plurality of threads based on an assignment algorithm; and partitioning entries from a Forwarding Information Base (FIB) table, wherein the entries map content names to ports on the content node, wherein each entry is partitioned in a FIB sub-table to the memory space allocated to the one of the particular threads associated with the namespace corresponding to the content name contained within the entry.

20 Claims, 9 Drawing Sheets

(56) References Cited

U.S. PATENT DOCUMENTS

| | | | |
|---|---|---|---|
| 2011/0271007 A1* | 11/2011 | Wang | H04L 45/306 |
| | | | 709/238 |
| 2012/0143877 A1* | 6/2012 | Kumar | H04L 45/745 |
| | | | 707/747 |
| 2013/0110987 A1* | 5/2013 | Kim | H04L 45/02 |
| | | | 709/219 |
| 2013/0275464 A1* | 10/2013 | Kim | H04L 67/06 |
| | | | 707/769 |
| 2014/0019409 A1* | 1/2014 | Tseng | G06F 17/30575 |
| | | | 707/609 |
| 2014/0188981 A1* | 7/2014 | Shi | H04L 67/1097 |
| | | | 709/203 |

* cited by examiner

BALANCED LOAD EXECUTION WITH LOCALLY DISTRIBUTED FORWARDING INFORMATION BASE IN INFORMATION CENTRIC NETWORKS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Conventional computer networks are built from a large number of network devices, such as routers, switches, and/or other hardware. Management of a large network can be complex and costly. It is believed that the complexity can be addressed by separating the bundling of control and data forwarding in traditional routers and replacing the use of fully distributed protocols for network control with centralized protocols. For example, data forwarding (e.g. data plane) is decoupled from control decisions (e.g. control plane), such as routing, resources and other management functionalities in a centrally-controlled network. The decoupling also allows the data plane and the control plane to operate on different hardware, in different runtime environments, and/or operate using different models. In the centrally-controlled network, network intelligence is logically centralized in software-based controllers. Thus, network devices become packet forwarding devices that are managed and controlled by the centralized controllers.

SUMMARY

In one embodiment, the disclosure includes a content node configured to operate in an Information Centric Network (ICN), the content node comprising a receiver configured to receive an Interest packet, the Interest packet comprising a requested content name identifying a content item located in the ICN; a memory comprising a memory sub-portion exclusively assigned to an assigned thread from a plurality of available threads, the memory sub-portion comprising a distributed Pending Interest Table (PIT) and a Forward Information Base (FIB) sub-table, wherein entries in the FIB sub-table are partitioned from a master FIB; a processor coupled to the receiver and the memory, the processor configured to forward the Interest packet to the assigned thread based on a mapping of a namespace of the content name to the assigned thread, wherein the assigned thread is configured to perform longest prefix matching (LPM) of the namespace against the FIB sub-table to identify a port associated with the content name; and create a pending interest entry for the Interest packet in the distributed PIT; and a transmitter coupled to the processor configured to forward the Interest packet through the identified port.

In another embodiment, the disclosure includes a computer program product comprising computer executable instructions stored on a non-transitory computer readable medium such that when executed by a control thread in a processor cause a network device to map a namespace at a defined level to a processing thread based on an assignment algorithm; create a bucket entry in a partition-mapping hash table for the mapping; and partition an FIB sub-table from an FIB in a first memory space allocated exclusively to the processing thread, wherein the FIB comprises entries mapping content names within the namespace to ports on the network device, wherein all entries in the FIB comprising content names within the namespace at the defined level are partitioned in the FIB sub-table.

In yet another embodiment, the disclosure includes a method comprising allocating each of a plurality of memory spaces coupled to a processor exclusively to a particular thread from a plurality of threads allocated in the processor, wherein the processor is in a content node; assigning each of a plurality of namespaces at a defined level exclusively to one of the particular threads from the plurality of threads based on an assignment algorithm; and partitioning entries from an FIB table, wherein the entries map content names to ports on the content node, wherein each entry is partitioned in a FIB sub-table to the memory space allocated to the one of the particular threads associated with the namespace corresponding to the content name contained within the entry.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

An Information Centric Network (ICN) is a type of network architecture that focuses on information delivery. ICNs may also be known as content-aware, content-centric, or data specific networks. ICNs shift the Internet protocol (IP) communication model from a host-to-host model to an information-object-to-object model. The IP host-to-host model addresses and identifies data by storage location, for example, by host IP address, whereas the information-object-to-object model employs a non-location based addressing scheme that is content-based. The entities that are distributed or operated on in an ICN communication model are information objects. Some examples of information objects may include content, data streams, services, user entities, and/or devices. In an ICN, information objects are assigned with application-based names, which are used to address the information objects, decoupling the information objects from locations. Routing to and from the information objects are based on the assigned names. ICN provisions for in-network caching, where a wide variety of network devices or elements serve as temporary content servers. For example, ICN nodes may maintain Pending Interest Tables (PITs), forwarding information bases (FIBs), and content stores (CSs) for data forwarding.

Disclosed herein are various mechanisms for distributing Interest and Data packet processing and dynamically balancing load during operation in a resource and space efficient manner within a network element (NE). As discussed below, information pertaining to namespaces in an ICN may be distributed and processed within an NE in a more distributed and flexible design in order to parallelize the workload. In such a system, each namespace at a defined level is assigned to a processing thread (assigned namespace). Based on this assignment, the FIB is partitioned into distributed FIB (dFIB) sub-tables on separate memory spaces allocated to each processing thread. A distributed PIT (dPIT) may also be partitioned in the allocated memory space. The distribution of the FIB entries to different processing threads reduces inter-process-call overhead during FIB lookups and limits hash table blocking. Additionally, such a system takes advantage of Non-Uniform Memory Access (NUMA) by localizing the dFIB sub-tables and allows for more efficient lookup techniques that can effectively utilize on-chip memories dedicated to lookups on the smaller sized dFIB sub-tables.

The disclosed distributed architecture allows for the use of faster components to access FIB entries, a reduction in processing latency, a reduction in inter-process communication overhead, and more robust hash table lookups. By distributing namespaces, the NE is able to maximize the performance of multi-threaded forwarding operation and to support effective load balancing. Because each processing thread has access to only a portion of the FIB (e.g., the dFIB sub-table), the full memory space for the entire FIB does not have to be allocated to every thread. Additionally, the processing threads have limited or restricted access to the memory spaces not allocated to them.

Figure 1:
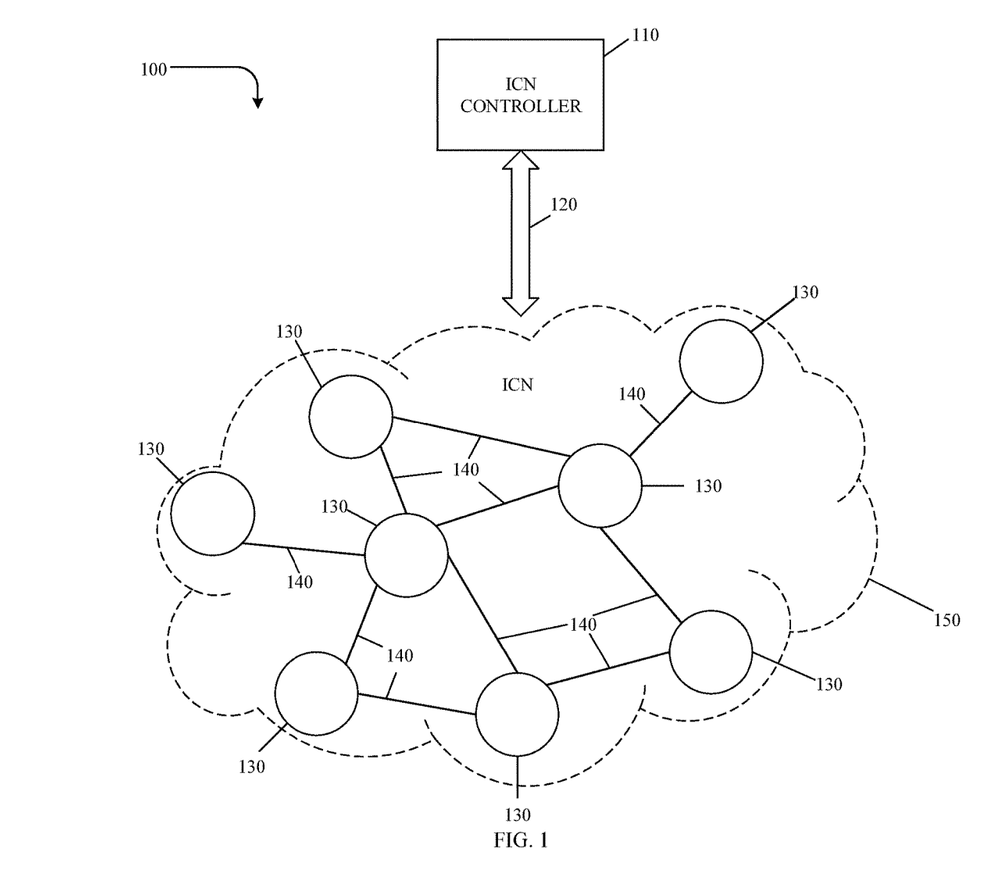
FIG. 1 is a schematic diagram of an embodiment of an Information Centric Network (ICN) architecture.

FIG. 1 is a schematic diagram of an embodiment of an ICN architecture 100. The ICN architecture 100 comprises an NE acting as an ICN controller 110, and an ICN 150. The ICN 150 comprises a plurality of NEs acting as content nodes 130 and/or other NEs, such as content producers and/or content consumers, interconnected by a plurality of links 140. The ICN 150 provides in-network caching, built-in content security, and multi-cast data distributions according to the ICN protocol. The ICN 150 may comprise one or more networking domains that are operated by one or more administrative domains. The links 140 may comprise physical links, such as fiber optic links, electrical links, wireless links, and/or logical links used to transport data in the ICN 150.

The ICN controller 110 may be any device configured to manage and/or control the ICN 150. The ICN controller 110 may be physically or logically located within the ICN 150. In an embodiment, the ICN controller 110 may be a centralized logical entity distributed across one or more NEs. In another embodiment, the ICN controller 110 may be implemented as a network control module within a virtual machine (VM). The ICN controller 110 performs a variety of network control functions according to the application-specific objectives. Some examples of network control functions may include, but are not limited to, generating and maintaining network topologies, identifying application flows, and managing network resources and network state information.

To deliver content through the ICN 150, the ICN controller 110 may generate flow rules by computing one or more forwarding paths through the ICN 150 and may identify controls based on any application, content, or domain specific objectives. Some examples of controls may include security verifications and enforcements, context adaptations, content caching, policy enforcements, etc. After identifying the flow rules, the ICN controller 110 may generate a flow entry based on the flow rules and add the flow entry in each of the content nodes 130 along the forwarding path, for example, by sending the flow entry in a flow configuration message via a network control interface 120. The network control interface 120 supports communication between the ICN controller 110 and the content nodes 130 and may employ a standard communication protocol and/or extend a current communication protocol, such as the OpenFlow protocol.

The ICN controller 110 builds and maintains a global network topology view of the ICN 150 based on the flow rules identified in the ICN 150, where the global network topology view is an abstracted view of the underlying infrastructure of the ICN 150. For example, the global network topology view may include network resources, (e.g., bandwidth usage, bandwidth availability, and/or latencies), network statistics, and/or application statistics in addition to network connectivity information (e.g., interconnecting NEs and/or links).

The content nodes 130 may be any physical devices, such as routers and/or network switches, or logical devices configured to perform switching functions in the ICN 150 as directed by the ICN controller 110. The switching functions include forwarding incoming Interest packets based on entries in the FIB, applying flow rules to the incoming packets, measuring statistics, and monitoring context changes.

The content nodes 130 receive flow rules from the ICN controller 110, such as forwarding paths for content flow in the ICN 150. For example, the content nodes 130 create/update entries in the FIB based on the received flow paths. The FIB entries stores content name prefixes and corresponding outbound port(s) coupled to a next hop within the ICN toward a corresponding content producer.

To obtain a particular content item, a content consumer creates an Interest packet and sends the Interest packet through the ICN 150. The content item may be identified using hierarchically structured names that represent relationships between the different content items within the ICN 150. These names comprise any number of components where each component identifies a portion of the namespace hierarchy. The Interest packet comprises a content name for the particular content item. The Interest packet is routed through the ICN by the content nodes 130 toward the producers of the requested content item based on the content name.

When a content node 130 within the ICN 150 receives an Interest packet, the content node 130 determines where to forward Interest packet by applying a longest prefix matching (LPM) on the provided content name. This process is repeated at each content node 130 until the Interest packet is delivered to the content producer or content repository (e.g., content node 130 carrying the requested content). When the Interest packet reaches a node within the ICN that has the requested content, a Data packet comprising the content and the content name is built and returned back to the consumer through the ICN 150 along the same path traveled by the Interest packet. This return path is based on state information set up by content nodes 130 that forwarded the corresponding Interest packet. Both the Interest and Data packets may not carry any host or interface addresses.

Content nodes 130 within the ICN 150 keep both Interests and Data packets for a period of time. When the content nodes 130 receives multiple Interest packets for the same content, the content nodes 130 forward only the first Interest packet received toward the content producer. The information on the Interest packets that the content nodes 130 receive is stored in a PIT for a defined period of time or until a corresponding Data packet is received. An entry in the PIT contains the requested content name and the Interest packet origin (e.g., the previous hop). When the content nodes 130 receive a Data packet, the content nodes 130 forward the Data packet based on all active PIT entries for the received content. PIT entries are removed once satisfied and the content nodes 130 cache the received content in the CS. Content cached in the CS is utilized by the content nodes 130 to satisfy any received Interest packets without forwarding the Interest packet.

The content nodes 130 measure and track flow statistics as packets arrived at the content node 130. For example, the flow statistics may be application-specific statistics, such as content popularity, or business-specific, such as content provider popularity. Content popularity refers to the number of requests for a particular content item received from content consumers. Content provider popularity refers to the number of content consumers that download content via a particular content provider. The content nodes 130 provide the measured statistics to the ICN controller 110.

Figure 2:
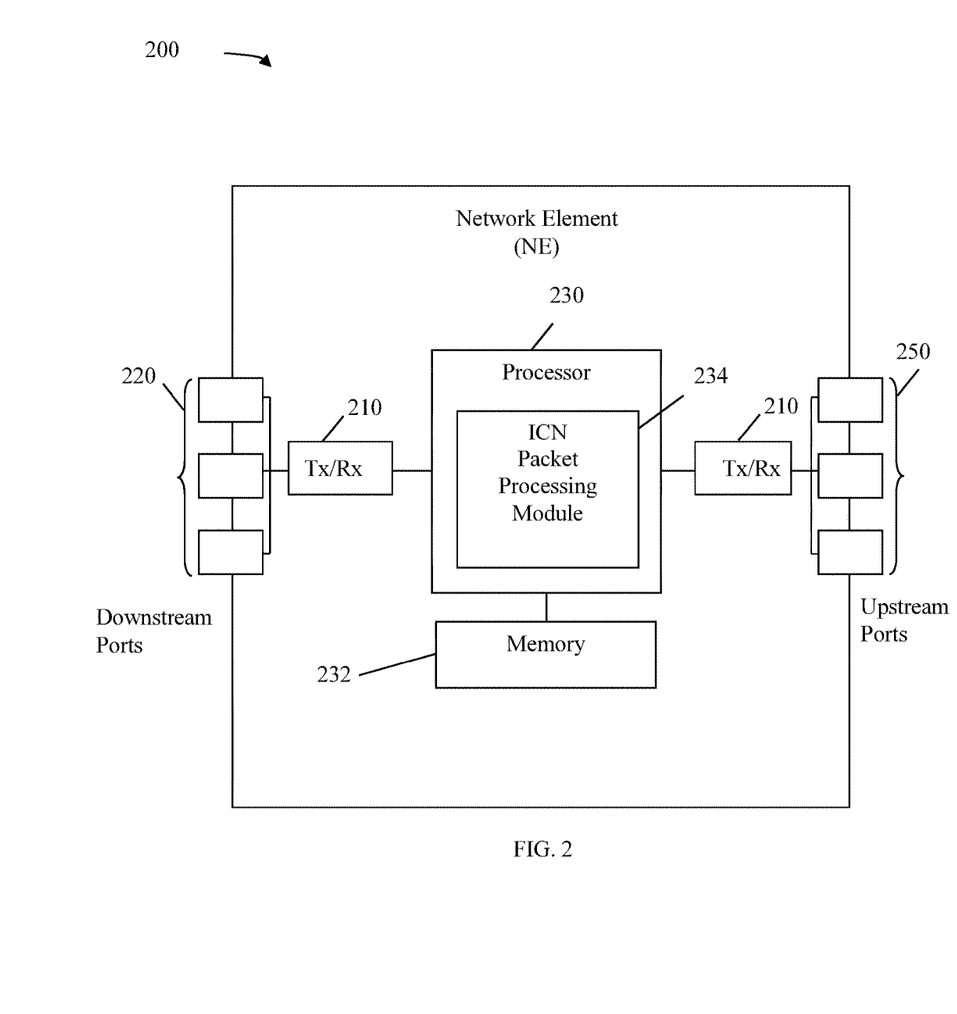
FIG. 2 is a schematic diagram of an embodiment of an network element (NE) within an ICN.

FIG. 2 is a schematic diagram of an embodiment of an NE 200 within an ICN 150. NE 200 may be any component configured to act as an ICN controller 110 and/or content nodes 130. NE 200 may be implemented in a single node or the functionality of NE 200 may be implemented in a plurality of nodes. One skilled in the art will recognize that the term NE encompasses a broad range of devices of which NE 200 is merely an example. NE 200 is included for purposes of clarity of discussion, but is in no way meant to limit the application of the present disclosure to a particular NE embodiment or class of NE embodiments.

At least some of the features/methods described in the disclosure are implemented in a network apparatus or component such as an NE 200. For instance, the features/methods in the disclosure may be implemented using hardware, firmware, and/or software installed to run on hardware. The NE 200 is any device that transports packets through a network, e.g., a switch, router, bridge, server, a client, etc.

As shown in FIG. 2, the NE 200 may comprise transceivers (Tx/Rx) 210, which are transmitters, receivers, or combinations thereof. A Tx/Rx 210 is coupled to a plurality of downstream ports 220 (e.g. downstream interfaces) for transmitting and/or receiving packets from other nodes and a Tx/Rx 210 coupled to a plurality of upstream ports 250 (e.g. upstream interfaces) for transmitting and/or receiving packets from other nodes, respectively. A processor 230 is coupled to the Tx/Rxs 210 to process the packets and/or determine which nodes to send packets to. The processor 230 may comprise one or more multi-core processors and/or memory 232 devices, which function as data stores, buffers, Random Access Memory (RAM), Read Only Memory (ROM), etc. Processor 230 may be implemented as a general processor or may be part of one or more application specific integrated circuits (ASICs) and/or digital signal processors (DSPs). Processor 230 comprises an ICN Packet Processing Module 234, which implements at least some of the methods discussed herein such methods 400, 600, 700, 800, and/or 900 described below. In an alternative embodiment, ICN Packet Processing Module 234 is implemented as instructions stored in memory 232, which are executed by processor 230, or implemented in part in the processor 230 and in part in the memory 232, for example a computer program product stored in a non-transitory memory that comprises instructions that are implemented by the processor 230. In another alternative embodiment, the ICN Packet Processing Module 234 is implemented on separate NEs. The downstream ports 220 and/or upstream ports 250 may contain electrical and/or optical transmitting and/or receiving components.

It is understood that by programming and/or loading executable instructions onto the NE 200, at least one of the processor 230, ICN Packet Processing Module 234, Tx/Rxs 210, memory 232, downstream ports 220, and/or upstream ports 250 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design is developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
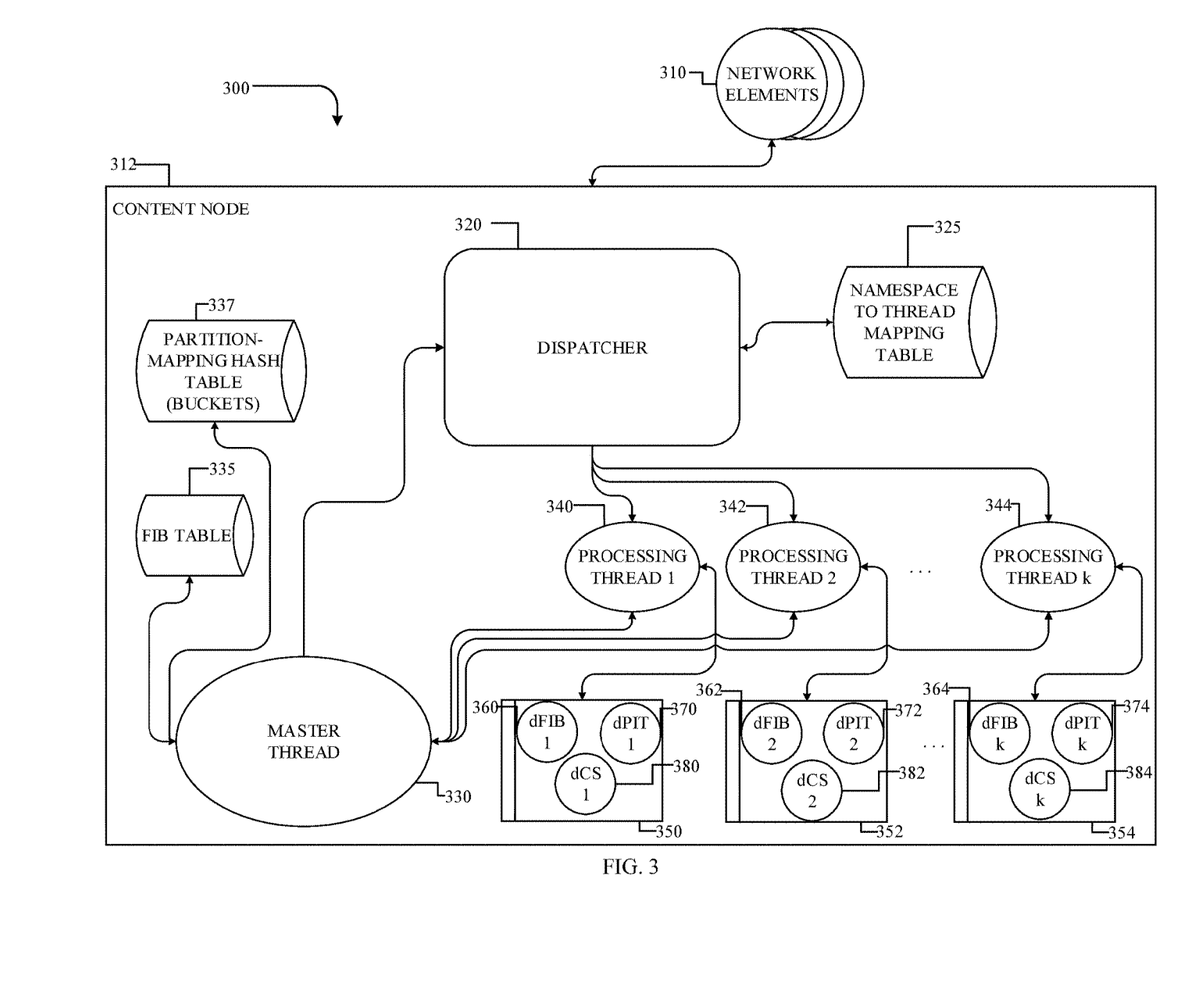
FIG. 3 illustrates an embodiment of an NE configured to act as a content node in an ICN.

FIG. 3 illustrates an exemplary embodiment 300 of an NE, such as NE 200, configured to act as a content node 312 in an ICN, such as ICN 150. For example, content node 312 may be implemented as ICN Packet Processing Module 234 in NE 200, which itself could be implemented as content node 130 in ICN 150. Content node 312 receives and forwards Interest and Data packets within the ICN. The Interest and Data packets are received from and sent to NEs 310 such as content nodes 130, content producers, and/or content consumers. The content node 312 comprises a dispatcher 320, a master thread (MThread) 330, multiple processing threads 340, 342, and 344, and multiple memory spaces 350, 352, and 354.

The dispatcher 320 forwards incoming Interest packet and Data packets to appropriate thread(s). Incoming Interest packet data is sent to the dispatcher 320. The dispatcher 320 distributes the Interest packet data to processing threads 340, 342, and 344 based on a mapping of namespaces to processing threads. The dispatcher periodically receives namespace-to-thread mapping data from the MThread 330 and stores the data in the namespace-to-mapping table 325. The dispatcher 320 may be running in a separate thread from the MThread 330.

The MThread 330 creates and manages mappings of the namespaces for the domains indexed on the content node 312 to the processing threads 340, 342, and 344. When the assigned namespaces are assigned or reassigned to the processing threads 340, 342, and 344, the MThread 330 may send the thread mapping information to the dispatcher 320. The MThread 330 creates and maintains a partition-mapping hash table 337 containing bucket entries for the mapped namespaces at the defined level. The buckets comprise a key, which may be a result of hash function(s) and modulus operation(s) on the assigned namespace components, a unique identifier for the assigned processing thread, processing overhead of FIB entries for the assigned namespace, and storage overhead of FIB entries for the assigned namespace. In an embodiment, a bucket entry comprises a processing load and a storage requirement. In one embodiment, the MThread 330 receives namespace processing and storage overhead data periodically from the processing threads 340, 342, and 344 and updates the processing and storage overhead data in the corresponding bucket entries accordingly. In an embodiment, an assigned thread is configured to send the bucket entry to the MThread 330 at specific intervals. The MThread 330 may redistribute the assigned namespaces among the processing threads 340, 342, and 344 to balance the processing overhead. The MThread 330 may consider the number of dPIT entries and FIB storage and processing utilization for the assigned namespace size when determining which namespaces to transfer.

For each assigned namespace, the MThread 330 partitions entries in the master FIB 335 to a memory space allocated to the processing thread assigned to the namespace thus creating a dFIB sub-table. Additionally, the assigned processing thread may allocate a dPIT in the allocated memory space to create and update entries for content requests corresponding to the assigned namespace. A distributed Content Store (dCS) comprising cached content objects for the assigned namespace may also be allocated in the assigned memory space. Each processing thread may have limited or no interaction with memory spaces allocated to other processing threads.

The MThread 330 manages a centralized copy of the FIB (master FIB) 335. Additionally, the content node may update both the master FIB and dFIB sub-tables. In various embodiments, the MThread 330 performs updates to the master FIB 335 and partitions entries in the master FIB into dFIB sub-tables 360, 362, and 364 on memory spaces 350, 352, and 354, respectively, allocated to each processing thread 340, 342, and 344, respectively, based on the assigned namespaces. Each dFIB sub-table 360, 362, and 364 contains entries for the namespaces assigned to the processing thread that is assigned to the memory space where the dFIB sub-table is partitioned. In one embodiment, the FIB entries are Horizontal partitioned where each row/entry in the partitioned dFIB sub-table is unambiguously assigned to a single partition. In one embodiment when FIB entry updates are received for the master FIB, the MThread 330 updates the dFIB sub-tables 360, 362, and 364 in addition to the master FIB 335. In another embodiment, the MThread 330 sends the FIB entry updates to the processing threads 360, 362, and 364 and the processing threads 360, 362, and 364 perform updates to the corresponding dFIB sub-table entries. In yet another embodiment, a partitioning key comprising one or more columns determines the partition where each row will be stored. Operations to the appropriate partition are made through the use of the partitioning key.

The processing threads 340, 342, and 344 manage data retrieval for assigned namespaces. The processing threads 340, 342, and 344 may send updates to the MThread 330 periodically regarding aggregated PIT data and FIB overhead and processing data for each assigned namespace. The processing threads 340, 342, and 344 may create and update entries in their respective dPIT 370, 372, and 374 allocated in their respective assigned memory space 350, 352, and 354. The processing threads 340, 342, and 344 may update cached content within their respective dCS 380, 382, and 384 allocated in their respective assigned memory space 350, 352, and 354 when Data packets are received. The processing threads may maintain a local mapping to physical memory locations of the dFIB sub-table, the dPIT, and the dCS. In one embodiment, the dPIT and dCS are allocated in the same memory space as the dFIB sub-table. In another embodiment, the dPIT is maintained in a separate memory space from the dFIB sub-table. In this embodiment, the dCS may be maintained in the same memory space as the dPIT, but separate from the dFIB sub-table or the dCS may be maintain in a separate memory space from both the dFIB sub-table and dPIT. In one embodiment, the dPIT is empty at initialization. New dPIT entries are created as Interest packets are processed by the processing thread. The dPIT may be dynamically increased by the processing thread within an allocated memory space. In one embodiment, interaction between processing threads is limited or restricted. In another embodiment, support may be provided for PIT aggregation between the processing threads.

In various embodiments, an Interest packet received by the content node 312 is distributed by the dispatcher 320 to the processing thread mapped to the namespace of the requested content name (requested namespace). The dispatcher may search for the assigned processing thread in the namespace-to-thread mapping table 325 based on a hash function(s) and modulus operation(s) performed on the requested namespace at a defined level. The dispatcher forwards the Interest packet data to the assigned processing thread.

In various embodiments, the assigned processing thread checks the dCS (or the centralize CS if the dCS is not implemented on the NE) for the requested content when Interest packet data is received. If the content is found, the assigned processing thread creates a Data packet comprising the requested content and the content name. If the content is not found in the dCS, the assigned processing thread retrieves the port assigned to the requested content name from the dFIB sub-table and creates or updates a corresponding entry in the dPIT for the requested content name. The assigned processing threads return the port assigned to the requested namespace. The content node then forwards the Interest packet to the next hop in the ICN through the retrieved port.

The defined level for the namespaces indexed on the content node 312 may be determined based on load of the content node 312 and/or the composition of the namespaces for index domains of the ICN. The content node 312 may update the defined level periodically and subsequently remap the namespaces. The content node 312 may update the defined level based on a change in the number of indexed domains, the aggregated load on the content node 312, and/or a change composition of the namespaces. The content node 312 may also update the defined level based on updated setting or performance requirement on the content node or for the ICN.

In various embodiments, a Data packet received by the content node 312 is distributed by the dispatcher 320 to the processing thread mapped to the namespace of the received content name (received namespace). The dispatcher may search for the assigned processing thread in the namespace-to-thread mapping table 325 based on a hash function(s) and modulus operation(s) performed on the received namespace at a defined level. The dispatcher forwards the Data packet data to the assigned processing thread. In various embodiments, the assigned processing thread determines any active interests contained in the dPIT corresponding to received namespace. The active interests are serviced by forwarding the received Data packet toward the requesters of the content contained in the active entries.

In various embodiments, the Data packet may be forwarded to the previously assigned processing thread in addition to the currently assigned thread. The dispatcher 320 determines whether to send the Data packet to the previously assigned processing thread based on a PIT counter or a bloom filter corresponding to the received content. In an alternate embodiment, the dispatcher sends the Data packet to the previously assigned thread if no active dPIT entries are found by the currently assigned thread. In yet another embodiment, the previously assigned thread may also be sent the Data packet when the Data packet is received within a determined time from the reassignment of the reassigned namespace. In one embodiment, the determined time is based on a roundtrip time through the ICN. When the previously assigned processing thread receives a Data packet, the previously assigned processing thread services any active dPIT entries for the content in a similar manner to the currently assigned processing thread.

Figure 4:
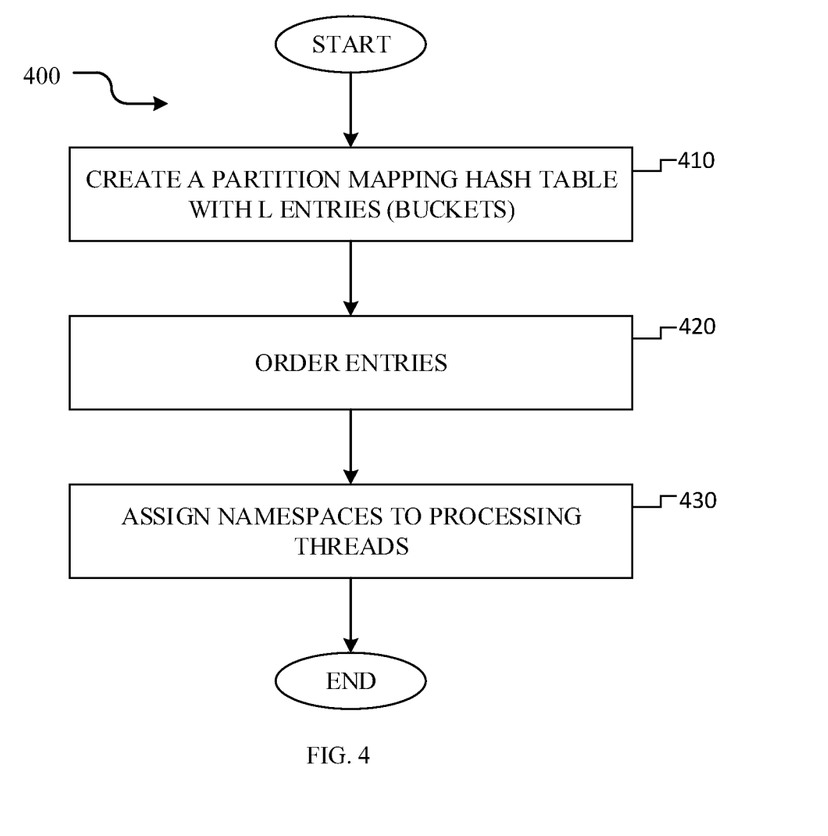
FIG. 4 is a flowchart of an embodiment of a method of distributing namespaces to processing threads and storing the information in a partition mapping hash table.

FIG. 4 is a flowchart of an embodiment of a method 400 of distributing namespaces to processing threads and storing the mapping information in a hash table, such as the partition-mapping hash table 337. Method 400 may be implemented by a NE, such as content node 312, within an ICN, such as ICN 150. Method 400 may be implemented when an NE, such as content node 312, is initialized. The NE assigns the namespaces at the defined level for the indexed domains to processing threads, such as processing threads 340, 342, and 344, at initialization.

At step 410, the NE may initialize namespace distribution based on the first component hash. In such a case, the NE may implement a partition-mapping hash table comprising a number of bucket entries L, where L<<N1 and L>>|C|.|C| represents the number of cores/threads and Ni is the number of indexed domains at the first level. Namespaces are mapped at the defined level. Assigned namespaces can then be assigned and transferred via the bucket entries from one processing thread to another. The NE may distribute the namespaces through the bucket entries based on, for example, the number of entries in the FIB for a given namespace to evenly distribute storage overhead.

At step 420, the bucket entries may be ordered based on attribute associated with the corresponding namespace. These attributes may include: FIB storage requirements, distribution of namespace activity, and popularity of the namespace among others. In one embodiment, the NE may order the bucket entries at step 420 based on accumulated data regarding the distribution of namespace activity or popularity in addition to the FIB storage requirement. For example, bucket entries may be ordered in decreasing popularity and storage requirement (FIB Table size) with popularity given the higher importance (e.g., {max(popularity), max(storage)}, . . . {max(popularity), min(storage)}, {min(popularity), max(storage)} . . . {min(popularity), min(storage)}}). In either embodiment, ties may be broken randomly or by some other algorithm.

At step 430, the NE may employ a round robin based distribution algorithm to assign the ordered namespaces to different processing threads until all buckets have been assigned. Alternatively at step 430, the namespaces may be distributed to the processing threads base on balancing the storage requirements per processing thread where the next bucket entry is assigned to the minimum loaded processing thread until all entries are assigned. In an embodiment, an assignment algorithm is configured to assign a namespace with a largest storage requirement to a thread with a smallest load until each namespace from the plurality of namespaces is assigned. In this embodiment, the bucket may be ordered base on FIB storage requirements before distribution. In an alternative embodiment, steps 420 and 430 are combined into a single step where the namespaces are assigned and the statistics regarding the buckets are gathered as the buckets are ordered.

Figure 5:
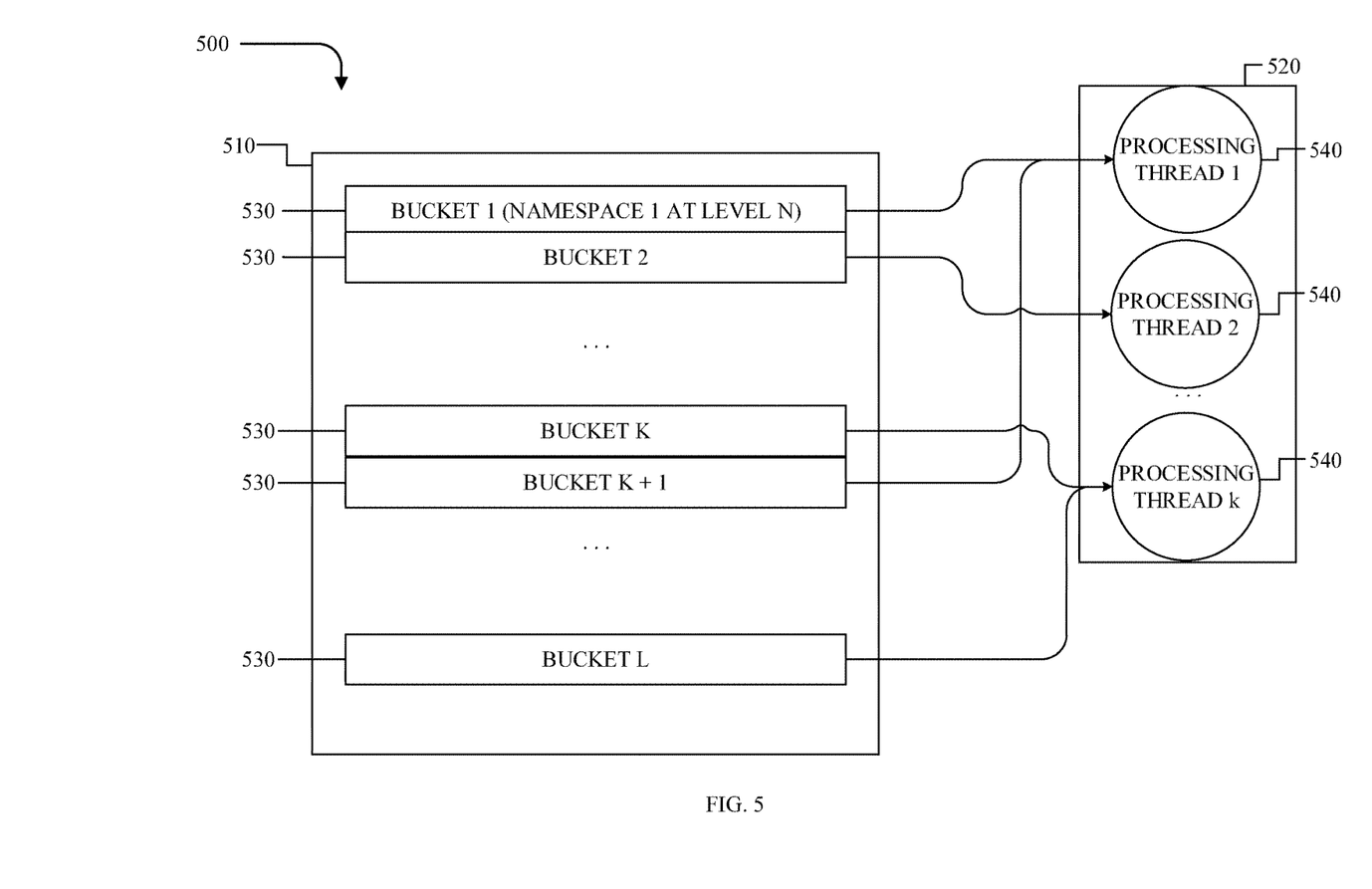
FIG. 5 is a schematic diagram of an embodiment of a mechanism for assigning namespaces to processing threads.

FIG. 5 is a schematic diagram of an embodiment 500 of a mechanism for assigning namespaces contained within bucket entries 530 to processing threads 520 by a content node, such as content node 312, in an ICN, such as ICN 150. Processing threads 540 may be similar to processing threads 340, 342, and 344. Embodiment 500 may be performed in a content node by a thread, such as MThread 330.

Bucket entries 530 are contained within a hash table, such as the partition-mapping hash table 337. Bucket entries 530 comprise a key corresponding to hash function(s) and modulus operation(s) applied to components of an assigned namespace, an assignment index corresponding to an assigned processing thread 540; a Central Processing Unit (CPU) load measure for the assigned namespace, which includes but is not limited to FIB utilization rate and/or PIT/FIB lookup performance; and PIT/FIB storage requirements for the assigned namespace. Thus, the hash table enables the content node to aggregate information regarding assigned namespace through, for example, the performance overhead and storage overhead attributes. Processing overhead includes PIT update overhead (e.g., insert, update, and/or remove), FIB lookup overhead, and CS retrieve overhead. Processing overhead may be initialized with respect to FIB specs (e.g., size and entries) to FIB size and updated based on additional PIT and CS requirements during operation time. In one embodiment, processing overhead is updated regularly during operation time by each processing thread locally. In this embodiment, processing overhead information is forwarded to MThread periodically. Storage overhead identifies storage requirements for namespace and may be updated regularly by each processing thread 540. Storage overhead includes both PIT, CS, and FIB entries (e.g., entries in the dPIT, dC, and dFIB).

The content node maintains lookup consistency for the assigned namespaces via the bucket entries. All content names within the namespace under the defined level may be stored/grouped in the same bucket entry 530 such that all grouped content names mapped to the same bucket entry 530 when the hash function(s) and modulus operation(s) are applied to the namespace at the defined level. Thus, each bucket entry 530 may represent thousands or millions of content names within the namespace and these content names may be mapped to the same processing thread 540.

During initialization, each bucket entry 530 is ordered in a manner such as described by step 420. The ordered bucket entries 510 are then assigned to a processing thread 520 based on the bucket entry order in a manner such as described by step 430. The assigned processing thread identifier is stored in the corresponding bucket entry.

Figure 6:
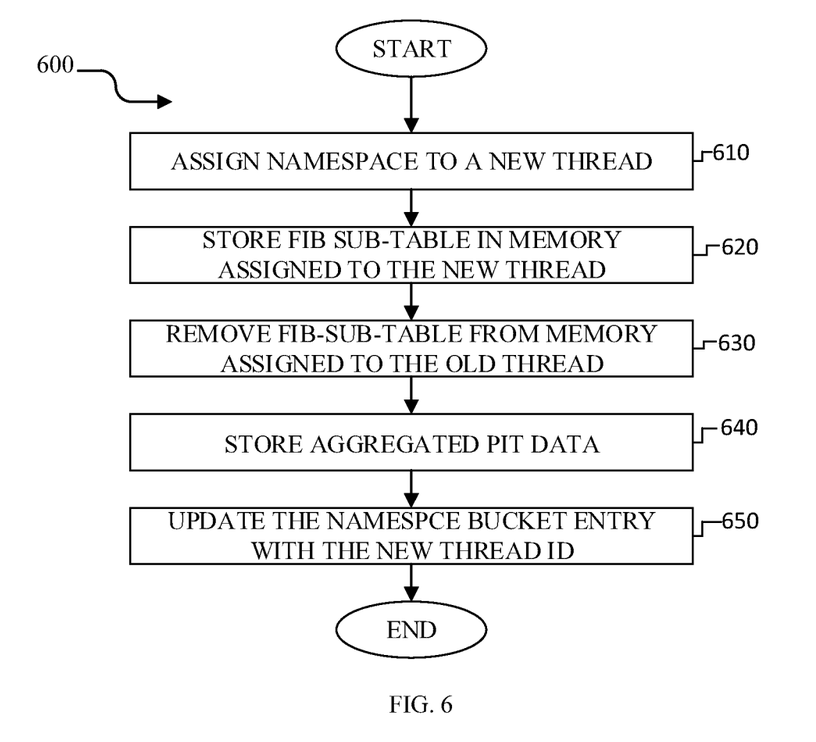
FIG. 6 is a flowchart of an embodiment of a method of moving data associated with a namespace from a previously assigned processing thread to a newly assigned thread.

FIG. 6 is a flowchart of an embodiment of a method of moving data allocated for an assigned namespace from a previously assigned thread to a newly assigned thread. Method 600 may be implemented by a NE, such as content node 312, within an ICN, such as ICN 150. Method 600 may be implemented during operation of an NE, such as content node 312, as processing and storage resources are utilized.

During operation, processing overhead for processing threads, such as processing thread 340, 342, and 344, vary depending on the distribution of incoming Interest packets. Each processing thread may store aggregated information regarding the resource utilization associated with the assigned namespaces in the corresponding entries in the dFIB sub-table. This aggregated information may be periodically shared with a MThread, such as MThread 330. The MThread may then update resource utilization within a master FIB, such as master FIB 335 and/or a hash table, such as the partition-mapping hash table 337. In one embodiment, the following equation is employed to represent the processing overhead: $\alpha I + \beta L + \gamma C$, where $\alpha$, $\beta$, $\gamma$ represents weights for PIT update (I), FIB lookup (L), and CS retrieve (C) overheads respectively. These weights may be updated periodically.

In order to maintain a balance of the loads between processing threads the MThread may periodically, based on for example a set interval or the discrepancy in loads between processing threads, dynamically redistribute the assigned namespaces. When determining whether to transfer an assigned namespace to a different thread, the content node may take into account the processing and storage overhead of the namespace in the FIB as well as the number of entries in the dPIT for the assigned namespace. In one embodiment, the MThread may reassign namespaces to maintain evenly distributed resource allocation for the dFIB sub-tables. In this embodiment, namespaces may be transferred from the highest utilized processing threads to the lowest utilized processing threads. In another embodiment, the NE may reassign namespaces based on the existing PIT entry count and avoid reassigning namespaces with a large number of active PIT entries. In yet another embodiment, the NE may use a combination of the two.

In various embodiments, the transfer of an assigned namespace to a different processing thread includes repartitioning of the entries in the dFIB sub-table for the reassigned namespace to the memory space allocated for the newly assigned processing thread. Additionally, entries in the dCS as well as aggregated data regarding dPIT entries may be transferred to the newly assigned processing thread. For example in an exemplary embodiment at step 610, the NE transfers a namespace to different processing thread. At step 620, the entries in the FIB sub-table are repartitioned to the memory space allocated to the newly selected processing thread. At step 630, the corresponding FIB entries may be removed from the memory space assigned to the previously assigned processing thread. At step 640, the NE may also transfer aggregated and compressed PIT data including bloom filters, PIT size, counter information, and round trip time to the newly selected processing thread. The dPIT entries may not be transferred to the newly selected processing thread and remain allocated in the memory space assigned to the previously assigned processing thread until the entries are serviced or deleted based on, for example, a timeout. Thus, the previously assigned processing thread may still service any active dPIT entries after a namespace has been reassigned for a determined amount of time or based on the counter value or the bloom filter associated with the reassigned namespace or a combination of each. Entries in the dCS corresponding to the reassigned namespaces may also be repartitioned onto the memory space assigned to the newly assigned processing thread. At step 650, The bucket entries are updated with the newly assigned processing thread id.

Figure 7:
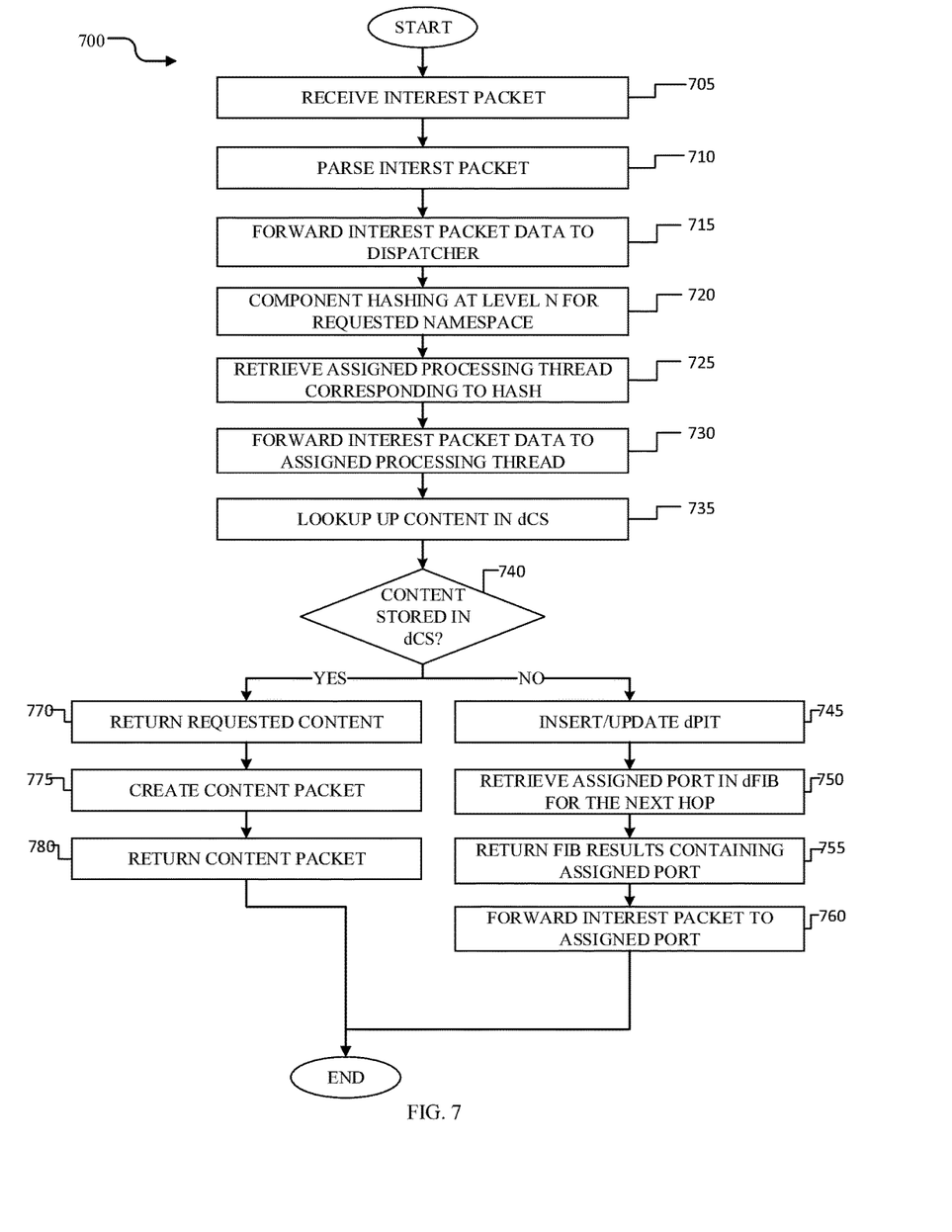
FIG. 7 is a flowchart of an embodiment of a method of handling an Interest packet with a network device.

FIG. 7 is a flowchart of an embodiment of a method 700 of handling an Interest packet. Method 700 may be implemented by a NE, such as content node 312, within an ICN, such as ICN 150. Method 700 may be implemented when an NE, such as content node 312, receives an Interest packet. At step 705, the NE receives an Interest packet. The Interest packet may be received from another NE within the ICN or from a NE outside of the ICN. Alternatively, the Interest packet may be received directly from a consumer. At step 710, the NE parses the Interest packet and builds data objects from the Interest packet. At step 715, the NE forwards the Interest packet data to a dispatcher, such as dispatcher 320. At step 720, the dispatcher employs a hash function(s) and modulus operation(s) at the defined level for the requested namespace. At step 725, the dispatcher retrieves the assigned processing thread based on the results from the hash function and the modulus operation from a mapping table, such as namespace-to-thread mapping table 325. At step 730, the dispatcher forwards the Interest packet data to the assigned processing thread. At step 735, the assigned processing thread performs a lookup in the dCS (if implemented otherwise the lookup is performed on the centralize CS). At step 740, the assigned processing thread proceeds to step 745 if the requested content is not found in the dCS or to step 770 if the content is found. At step 745, the assigned processing thread inserts or updates an entry in the dPIT regarding the requested content. At step 750, the assigned processing thread retrieves the assigned port for the next hop in the ICN toward the requested content from the dFIB sub-table. At step 755, the assigned processing thread returns the results from the dFIB sub-table. At step 760, the NE forwards the Interest packet to the next hop through the port assigned to the requested content. At step 770, the assigned processing thread returns the requested content retrieved from the dCS. At step 775, the NE creates a Data packet comprising the content. At the 780, the NE returns the Data packet to network node from where it received the Interest packet.

Figure 8:
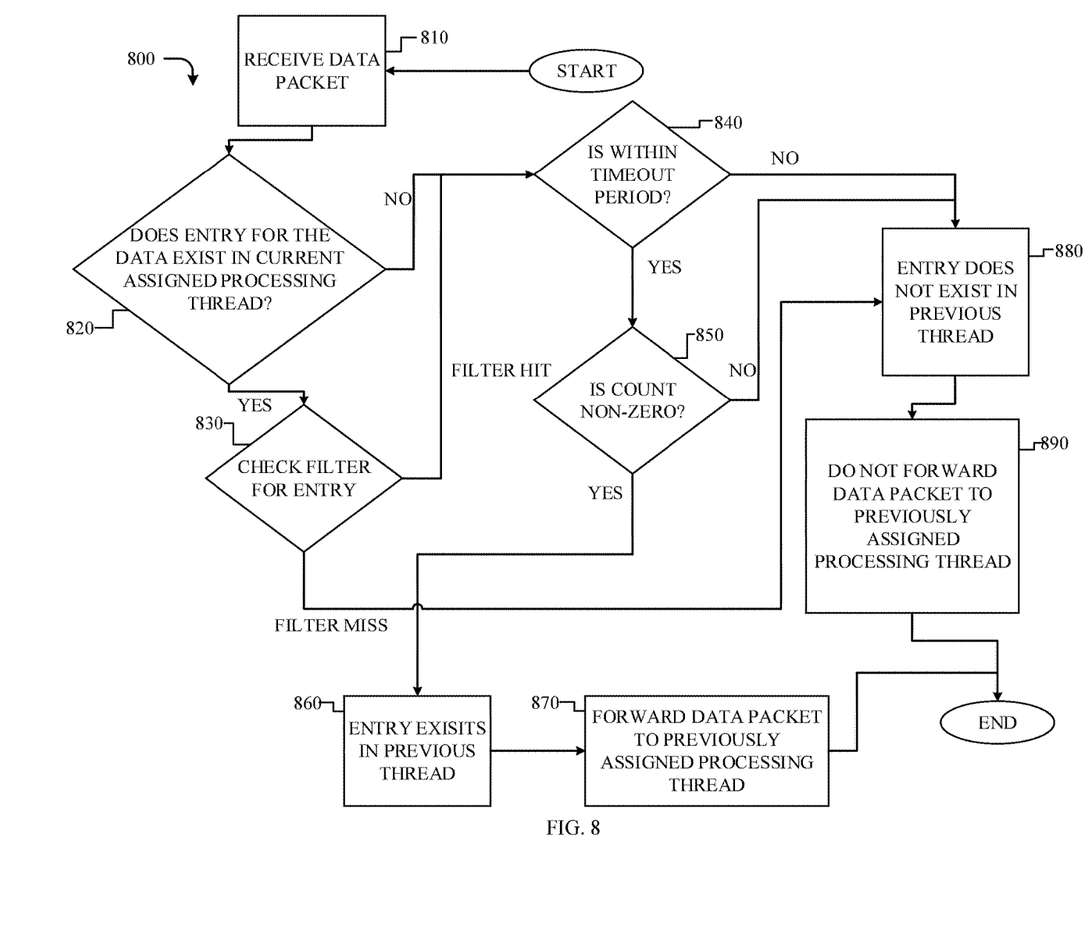
FIG. 8 is a flowchart of an embodiment of a method of handling a Data packet with a network device.

FIG. 8 is a flowchart of an exemplary embodiment of a method of handling a Data packet. Method 800 may be implemented by a NE, such as content node 312, within an ICN, such as ICN 150. Method 800 may be implemented when an NE, such as content node 312, receives an Data packet. At step 810, the content node receives a Data packet comprising a content name and the content data. The Data packet may be received from another NE within the ICN or from a source of the content. At step 820, the NE determines whether a PIT entry for the content exists in the dPIT of the currently assigned processing thread. If an entry exists, the NE proceeds to step 830 and checks a corresponding PIT filter. If an entry does not exist, the NE proceeds to step 840. At step 830, the NE checks the PIT filter corresponding to the content. If the filter check results in a miss, the NE proceeds to step 880. If the filter check results in a hit, the NE proceeds to step 840. At step 840, the NE determines whether the received Data packet is within the timeout period. If the Data packet was received within the timeout period, the NE proceeds to step 850. At step 850, the NE determines whether the counter is non-zero. If the counter is non-zero, the NE proceeds to step 860. If the counter is zero, the NE proceeds to step 880. At step 860, the NE concludes that a PIT entry exists in the dPIT of the previously assigned processing thread and proceeds to step 870. At step 870, the NE forwards the Data packet to the previously assigned thread. At step 880, the NE concludes that a PIT entry does not exist in the dPIT of the previously assigned processing thread at proceeds to step 890. At step 890, the NE does not forward the Data packet to the previously assigned thread.

In this embodiment, when a namespace has been transferred to a newly assigned processing thread, the previously assigned processing thread may have active entries in the dPIT. Entries in the dPIT allow the NE to track concurrent requests for the same content and provide multicast forwarding of Data packets to satisfy concurrent requests. The PIT may also enable the NE to provide multipath route discovery and identify routing loops. Various data structures may be employed within the PIT including Bloom filters, hashtables, and name prefix tries. A particular data structure may be chosen based on the performance of the NE and the expected load. Each PIT entry may comprise the content name field and an expiration field. The content name field may store the actual content name requested and the expiration field may indicate a time when the pending interest entry expires. The expiration field may be set based on the time a first Interest packet for content arrives. In various embodiments, the NE may use a lazy algorithm to delete expired entries as they are accessed. In one embodiment, the lazy algorithm marks the expired entry as delete and expired entry is deleted later. The NE may consider the marked entry as occupied during a search and as empty when performing an insert.

A timeout value based on a roundtrip time within the ICN may be stored in the bucket entry for the assigned namespace. In one embodiment, Data packet contents are forwarded to both the newly assigned and previously assigned processing threads when the Data packet is received within a difference (delta) of the roundtrip time from the reassignment. In another embodiment, the Data packet contents are forwarded to the previously assigned thread if no active entries for the content exist in the dPIT of the currently assigned processing thread and if the Data packet is received within a delta of the roundtrip time from the reassignment. In another embodiment, a counter representing the number of outstanding active dPIT entries may be stored for the assigned namespace. The NE may increment the counter value after a dPIT entry is created and decrement the content value after receiving a matching Data packet. Such counter values may be employed as a reference by the newly assigned thread to determine whether to forward the Data packet to the previously assigned thread. In another embodiment, the NE may implement local PIT filters based on Bloom filters per bucket entry. The PIT filters may be transferred to the newly assigned thread. In one embodiment, the PIT filters are compact data structures employed as a probabilistic representation of a set in order to support queries regarding the existence of a PIT entry for the given requested content. Each PIT filter comprises a plurality of bits, where each bit serves as an indicator of the presence of a particular PIT entry in the partitioned dPIT in which the PIT filter is located. The use of PIT filters reduces the search space necessary to perform a query regarding the existence of the PIT entry. The PIT filters may operate on pathnames, components, or any other types of metadata for the content. In one embodiment, when a PIT filter for a particular namespace indicates a positive match for the existence of a dPIT entry, the NE forwards the Data packet content to the previously assigned processing thread.

Figure 9:
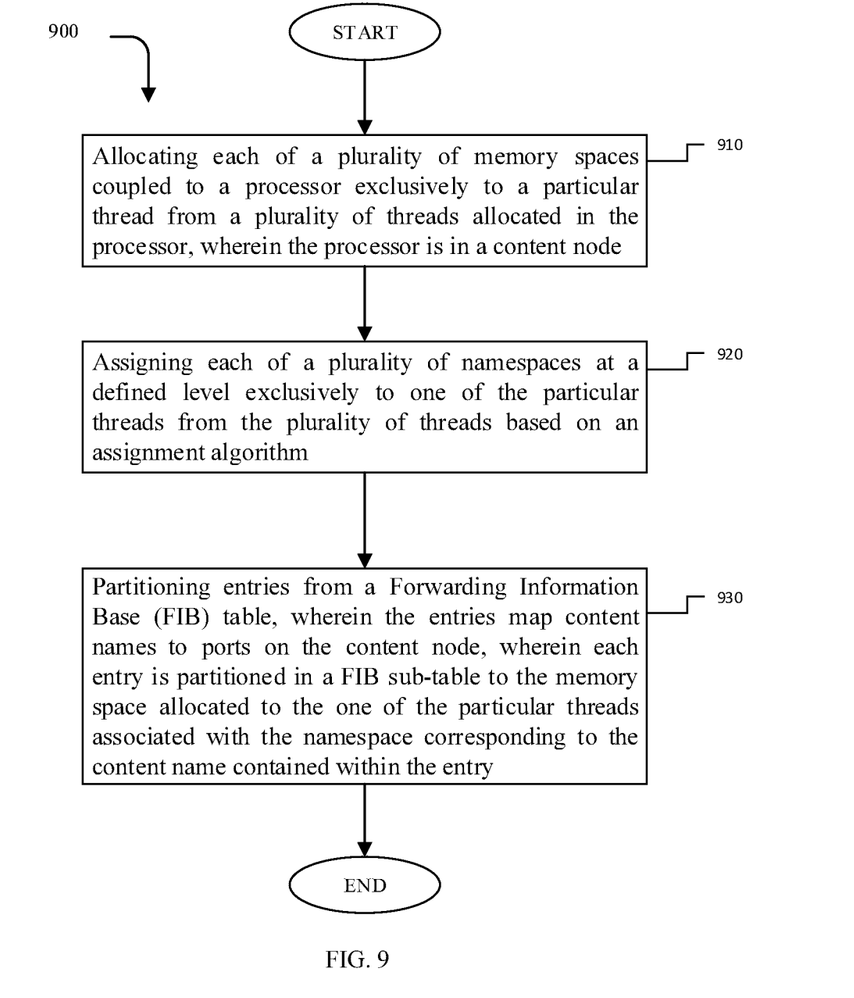
FIG. 9 is a flowchart of an embodiment of a method of mapping namespaces to processing threads and partitioning Forward Information Base (FIB) sub-tables to memories assigned to the processing threads.

FIG. 9 is a flowchart of an exemplary embodiment of a method of mapping namespace to threads and partitioning FIB sub-tables to memories assigned to the processing threads. Method 900 may be implemented by a NE, such as content node 312, within an ICN, such as ICN 540. Method 900 may be implemented in an NE, such as content node 312, during initialization. At step 910, the NE allocates each of a plurality of memory spaces coupled to a processor exclusively to a particular thread from a plurality of threads allocated in the processor, wherein the processor is in a content node. At step 920, the NE assigns each of a plurality of namespaces at a defined level exclusively to one of the particular threads from the plurality of threads based on an assignment algorithm. At step 930, the NE partitions entries from a FIB table, wherein the entries map content names to ports on the content node, wherein each entry is partitioned in a FIB sub-table to the memory space allocated to the one of the particular threads associated with the namespace corresponding to the content name contained within the entry.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A content node configured to operate in an information centric network (ICN), the content node comprising:

a receiver configured to receive an Interest packet, the Interest packet comprising a requested content name identifying a content item located in the ICN;

a memory comprising a memory sub-portion exclusively assigned to an assigned thread from a plurality of available threads, the memory sub-portion comprising a distributed Pending Interest Table (PIT) and a Forward Information Base (FIB) sub-table, wherein entries in the FIB sub-table are partitioned from a master FIB;

a processor coupled to the receiver and the memory, the processor configured to forward the Interest packet to the assigned thread based on a mapping of a namespace of the content name to the assigned thread, wherein the assigned thread is configured to:

perform longest prefix matching (LPM) of the namespace against the FIB sub-table to identify a port associated with the content name; and create a pending interest entry for the Interest packet in the distributed PIT; and a transmitter coupled to the processor, the transmitter configured to forward the Interest packet through the identified port to a next hop in the ICN.

2. The content node of claim 1, wherein the mapping is based on a number of entries in the FIB sub-table containing the namespace.

3. The content node of claim 1, wherein the mapping is based on a storage requirement in the FIB sub-table for entries containing the namespace and a popularity for content within the namespace on the content node.

4. The content node of claim 1, wherein the memory further comprises a dispatcher table containing an entry for the mapping, and wherein the entry is searchable based on a hash function and modulus operation of the namespace at a defined level.

5. The content node of claim 1, wherein the assigned thread is further configured to only access the memory sub-portion exclusively assigned to the assigned thread.

6. The content node of claim 1, wherein the processor is further configured to store a bucket entry comprising a processing load and a storage requirement for the namespace in a partition mapping hash table.

7. The content node of claim 6, wherein the assigned thread is further configured to send the bucket entry to a control thread at specific intervals.

8. A computer program product comprising computer executable instructions stored on a non-transitory computer readable medium such that when executed by a control thread in a processor cause a network device to:

map a namespace at a defined level to a processing thread in the processor based on an assignment algorithm;

create a bucket entry in a partition-mapping hash table for the mapping; and partition a Forwarding Information Base (FIB) sub-table from an FIB in a first memory space allocated exclusively to the processing thread, wherein the FIB comprises entries mapping content names within the namespace to ports on the network device, and wherein all entries in the FIB comprising content names within the namespace at the defined level are partitioned in the FIB sub-table.

9. The computer program product of claim 8, wherein the processing thread is configured to:

perform longest prefix matching (LPM) against the FIB sub-table to identify a port from the assigned ports associated with a requested content name; and create an entry for a received Interest packet comprising the requested content name in a distributed Pending Interest Table (PIT) allocated in the first memory space.

10. The computer program product of claim 9, wherein the processing thread is further configured to send a plurality of resource utilization metrics associated with the namespace to the control thread, and wherein the plurality of resource utilization metrics comprise a number of interests in the distributed PIT for content within the namespace, a number of updates to the distributed PIT regarding received Interests packet for the content within the namespace, a number of lookups in the FIB sub-table for the content within the namespace, and a number of retrievals from a Content Store for the content within the namespace.

11. The computer program product of claim 9, wherein the bucket entry comprises a unique identifier for the processing thread, a processing load, and a storage requirement.

12. The computer program product of claim 8, wherein the instructions further cause the control thread to:

assign the namespace to a second processing thread based on a resource utilization of the namespace and an availability of resources on the second thread;

repartition entries corresponding to the namespace to a second FIB sub-table partitioned in a second memory space allocated exclusively to the second processing thread; and transfer aggregated Pending Interest Table (PIT) data associated with the namespace to the second memory space, wherein the aggregated PIT data includes a bloom filter, a PIT entry counter, or timeout information, and wherein entries for the namespace in a distributed PIT are stored in the first memory space.

13. The computer program product of claim 8, wherein the first memory space is allocated on on-chip memory.

14. A method implemented by a processor in a content node, the method comprising:

allocating each of a plurality of memory spaces coupled to the processor exclusively to a particular processing thread from a plurality of processing threads in the processor allocated in the processor;

assigning each of a plurality of namespaces at a defined level exclusively to one of the particular processing threads from the plurality of processing threads based on an assignment algorithm;

partitioning entries from a Forwarding Information Base (FIB) table, wherein the entries map content names to ports on the content node, and wherein each entry is partitioned in a FIB sub-table to the memory space allocated to the one of the particular processing threads associated with the namespace corresponding to the content name contained within the entry, and transmit an Interest packet through one of the ports to a next hop in an information centric network (ICN).

15. The method of claim 14, wherein the processing threads are configured to:

perform longest prefix matching of a namespace of a requested content name against the corresponding FIB sub-table partitioned in the assigned memory space to identify a port mapped to the requested content name; and create a pending interest entry for requested content name in a distributed pending interest table (PIT) allocated in the assigned memory space.

16. The method of claim 14, wherein the assignment algorithm is configured to assign the namespaces in order of storage requirement until each namespace from the plurality of namespaces is assigned.

17. The method of claim 14, wherein the assignment algorithm is configured to assign a namespace with a largest storage requirement to a processing thread with a smallest load until each namespace from the plurality of namespaces is assigned.

18. The method of claim 14, further comprising creating a bucket entry in a partition mapping hash table for the namespaces at the defined level, wherein the bucket entry comprises a processing load, and a storage requirement.

19. The method of claim 14, further comprising:
receiving an interest for content in a receiver coupled to the processor, wherein the interest contains a requested content name comprising a requested namespace;
determining an assigned processing thread for the requested namespace based on a hash function and modulus operation of the requested namespace at the defined level resolved to an entry in a mapping table;
performing, by the assigned processing thread, longest prefix matching (LPM) of the requested namespace to identify a port;
creating, by the assigned processing thread, a pending interest entry for the interest in a distributed pending interest table (PIT) allocated in the assigned memory space; and
forwarding the interest through the port via a transmitter, wherein the transmitter is coupled to the receiver and the processor.

20. The method of claim 14, further comprising:
receiving a Data packet comprising content and a content namespace;
determining an assigned processing thread for the content namespace based on a hash function and modulus operation of the content namespace at the defined level resolved to an entry in a mapping table;
retrieving, by the assigned processing thread, active pending interest table (PIT) entries corresponding to the content namespace; and
routing the Data packet based on the active PIT entries.

* * * * *